United States Patent [19]

Griffin

[11] 4,102,872

[45] Jul. 25, 1978

[54] FLUOROCARBON TRIAZINE POLYMERS

[75] Inventor: Warren R. Griffin, Dayton, Ohio

[73] Assignee: The United States of America as represented by the Secretary of the Air Force, Washington, D.C.

[21] Appl. No.: 806,561

[22] Filed: Jun. 14, 1977

[51] Int. Cl.$^2$ .................... C08G 73/06; C08G 73/00
[52] U.S. Cl. .................................. 528/362; 526/246; 526/247; 528/342
[58] Field of Search .................. 260/78.41; 526/245, 526/246, 247

[56] References Cited

U.S. PATENT DOCUMENTS

| 3,317,484 | 5/1967 | Fritz et al. | 260/78.41 |
| 3,644,300 | 2/1972 | Dorfman et al. | 260/78.41 |
| 3,960,814 | 6/1976 | Cochoy | 526/246 |

Primary Examiner—Herbert J. Lilling
Attorney, Agent, or Firm—Joseph E. Rusz; Cedric H. Kuhn

[57] ABSTRACT

Linear fluorocarbon triazine containing polymers are prepared by reacting a fluorocarbon nitrile with ammonia and silver trifluoroacetate, and reacting the resulting silver chelate with a fluorocarbon acid anhydride to provide a triazine product. The triazine polymers are thermally and hydrolytically stable and resistant to degradation by fuels, properties which render them particularly useful in sealant applications.

7 Claims, No Drawings

FLUOROCARBON TRIAZINE POLYMERS

RIGHTS OF THE GOVERNMENT

The invention described herein may be manufactured and used by or for the Government of the United States for all governmental purposes without the payment of any royalty.

FIELD OF THE INVENTION

This invention relates to a process for preparing fluorocarbon triazine polymers. In one aspect it relates to fluorocarbon triazine polymers.

BACKGROUND OF THE INVENTION

There exists a need for a material which will fulfill requirements for dynamic seal applications, e.g., O-rings and gaskets, as well as sealant applications, e.g., fuel tank sealants, for current and future high performance aircraft. Triazine polymers have in the past been candidates for such a material. However, for one reason or another, the methods for preparing the polymers and the polymers themselves have not proven to be entirely satisfactory. A preferred method for preparing triazine elastomers is the dinitrilediamidine addition polymerization followed by cyclodehydration to the perfluoroalkylene triazine polymers. A serious deficiency in this method is the inordinately long reaction periods required for each batch of polymer. A reasonable reaction period on the order of a few hours is a requisite for conserving time. However, of even greater importance, a reasonable preparation time is necessary in order to inhibit hydrolysis during the several stages of the polymer preparation. The requirement for maintaining rigorous anhydrous conditions imposed by the prior art methods and the hydrolytic instability of the products obtained have had a tendency to discourage further research work in the area of triazine polymers.

It is a principal object of this invention, therefore, to provide an improved process for preparing linear fluorocarbon triazine containing polymers.

Another object of the invention is to provide silver coordination polymers which function as intermediates in the preparation of the fluorine-containing triazine polymers.

A further object of the invention is to provide fluorocarbon triazine polymers of controlled linear configuration.

Other objects and advantages of the invention will become apparent to those skilled in the art upon consideration of the accompanying disclosure.

SUMMARY OF THE INVENTION

In one embodiment, the present invention resides in a process for preparing fluorocarbon triazine containing polymers whereby a fluorocarbon nitrile is initially reacted with ammonia and a silver salt of a perfluorinated organic acid. The resulting silver coordinated polymer is then reacted with a fluorocarbon acid anhydride to provide a fluorine-containing triazine polymer product. The reactions involved in preparing the fluorocarbon triazine polymers can be represented by the following equations:

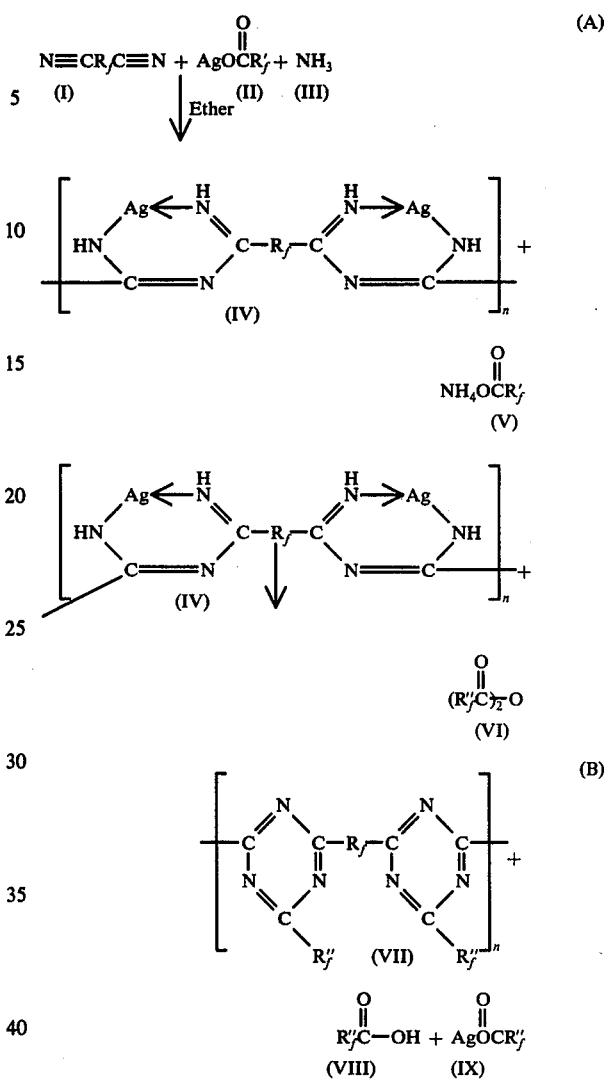

In the foregoing equations, $R_f$ is a perfluoroalkylene or perfluoroalkylene ether group; $R_f'$ and $R_f''$ are perfluoroalkyl radicals containing 1 to 12, inclusive, carbon atoms; and $n$ is an integer equal to the number of recurring units. The value of $n$ usually ranges from about 10 to 100 as determined by gel permeation chromatography. The number of recurring units can also be defined as such that the triazine polymers have an intrinsic viscosity $[n]$ ranging from about 0.2 to 0.6 as measured in perfluorotributylamine solvent at 37.8° C.

In another embodiment, the invention resides in a triazine polymer consisting essentially of recurring units having a structure as represented by Formula (VII) above.

As seen from equation (A), in preparing the fluorocarbon triazine polymers, a fluorocarbon dinitrile (I), a silver salt of an organic acid of the perfluorocarbon acetic acid series (II) and ammonia (III) are reacted in a suitable solvent. In carrying out the reaction, stoichiometric amounts of the reactants can be employed although it is often desirable to add an excess of ammonia. The reaction can be conveniently conducted at room temperature and autogeneous pressure for a period ranging from about 2 to 10 hours. As a solvent it is preferred to use an ether, such as diethyl ether or tetrahydrofuran, or a fluorohydrocarbon, such as 1,1,2-trifluoro-1,2,2-trichloroethane, or mixtures thereof. In a preferred procedure, compounds (I) and (II) are mixed with one another in a solvent after which an excess of ammonia, e.g., 1.5 to 2.0 moles per mole of compound (II), is bubbled through the mixture.

In the reaction described in the preceding paragraph, a silver coordinated polymer (IV) and an ammonium compound (V) are formed as shown by formula (A). The silver coordinated polymer is recovered by first filtering the mixture to separate the ammonium salt and then removing the solvent by vacuum distillation. Thereafter, the silver coordinated polymer is reacted with an excess amount, e.g., 1.5 to 2 moles per mole of polymer, of a fluorocarbon acid anhydride (VI) in accordance with formula (B). The reaction is generally carried out at about room temperature for a period of about 1 to 3 hours. As a result of this reaction, a fluorocarbon triazine polymer (VII) is formed. At the end of the reaction period, by-products (VIII) and (IX) are separated by filtration after which any excess anhydride is removed by vacuum distillation. The fluorocarbon triazine polymer product can be further purified by dissolving the polymer in a solvent, such as hexafluoroxylene, passing hydrogen chloride gas through the resulting solution, and separating any precipitated silver chloride from the solution. The solvent is then removed from the polymer product by vacuum distillation.

During the above-described synthesis, the silver cation provided by the silver salt (II) functions to coordinate the imidoyl amidine stage. The chelate (IV) that results holds the desired configuration and prevents chemical reaction at the site during the fluorocarbon nitrile-ammonia addition reaction. When the silver coordinated polymer is dissolved in the fluorocarbon acid anhydride, the silver is removed as the regenerated salt and the imidoyl amidine structure is acylated and cyclodehydrated to the desired triazine ring. The silver coordinated polymers are stable to normal heat, light and moisture which greatly simplifies preparative procedures.

As mentioned above, the $R_f'$ and $R_f''$ groups are perfluoroalkyls containing 1 to 12, inclusive, carbon atoms. The following are examples of these radicals: $-CF_3$, $-C_2F_5$, $-C_3F_7$, $-C_4F_9$, $-C_6F_{13}$, $-C_7F_{15}$, $-C_8F_{17}$, $-C_{10}F_{21}$, and $-C_{12}F_{25}$.

The source of the $R_f'$ groups are the silver salts (II) which are well known compounds. Examples of silver salts that can be employed include silver trifluoroacetate, silver perfluoropropionate, silver perfluorobutyrate, silver perfluorocaproate, silver perfluoropelargonate, silver perfluoroundecylate, silver perfluorodecylacetate, and the like.

The source of the $R_f''$ groups are the fluorocarbon acid anhydrides (VI) which are well known compounds. Examples of the anhydrides include trifluoroacetic anhydride, perfluorobutyric anhydride, perfluoropropionic anhydride, perfluorocaproic anhydride, perfluoropelargonic anhydride, perfluoroundecylic anhydride, perfluorolauric anhydride, and the like.

As indicated above, $R_f$ is a perfluoroalkylene or a perfluoroalkylene ether group. The perfluoroalkylene groups can be represented by the formula $+CF_2+_m$, where $m$ is a whole number, preferably ranging from 3 to 15, inclusive. The following are examples of perfluoroalkylene ether groups:

(1) $-CF_2O(CF_2)_2OCF_2-$,
(2) $-CF(CF_3)[OCF_2CF(CF_3)]_xO(CF_2)_5O[CF(CF_3)CF_2O]_yCF(CF_3)-$, where $(x+y)$ equals zero to 25, inclusive, preferably 2 to 20, inclusive,
(3) $-CF_2(OCF_2CF_2)_aO(CF_2)_5O(CF_2CF_2O)_bCF_2-$, where $(a+b)$ equals 2 to 7, inclusive,
(4) $+CF_2)_4OCH_2(CF_2)_3CH_2O(CF_2)_4-$,
(5) $+CF_2)_4OCH_2(CF_2)_4OCH_2(CF_2)_3CH_2O(CF_2)_4CH_2O(CF_2)_4-$, and
(6) $+CF(CF_3)[OCF_2CF(CF_3)]_xO(CF_2)_5O[(CF(CF_3)CF_2O]_yCF(CF_3)]_2O-$, where $(x+y)$ equals zero to 25, inclusive, preferably 2 to 20, inclusive.

In preparing a fluorocarbon dinitrile in which $R_f$ is radical (1) above, perfluorooxyacetic anhydride is subjected to the Kolbe dimerization reaction to give a diester. The diester is then converted to the diamide which is in turn converted to the dinitrile. These well known reactions are illustrated by the following equations:

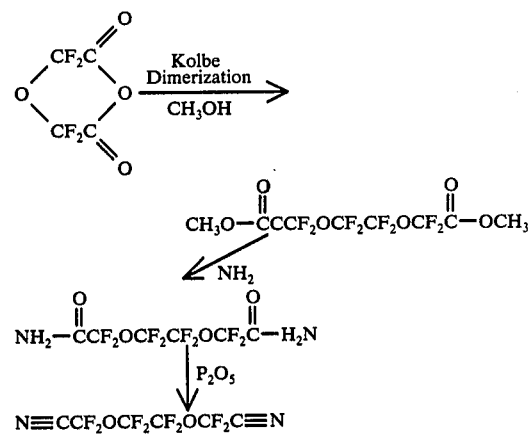

Fluorocarbon dinitriles in which $R_f$ is radical (2) above can be synthesized by initially preparing diacid fluorides as disclosed in U.S. Pat. No. 3,250,807. The diacid fluorides are then converted to the diamides by reaction with ammonia after which the diamides are reacted with phosphorus pentoxide to provide the dinitriles. The synthesis of dinitriles from diacid fluorides is also disclosed in U.S. Pat. No. 3,960,814 in which the compounds are designated as EDAF dinitriles.

The procedure for preparing fluorocarbon dinitriles in which $R_f$ is radical (3) above involves reacting perfluoroglutaryl fluoride and tetrafluoroethylene oxide in the presence of cesium fluoride. The diacid fluoride obtained is then reacted with ammonia to give the amide which is reacted with phosphorus pentoxide to provide the dinitrile. The reaction can be represented by the following equation:

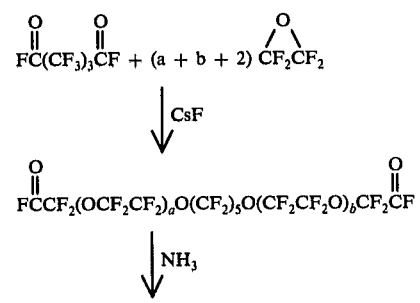

-continued

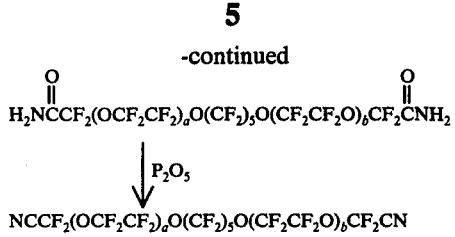

$$H_2NCCF_2(OCF_2CF_2)_aO(CF_2)_5O(CF_2CF_2O)_bCF_2CNH_2$$

$$\downarrow P_2O_5$$

$$NCCF_2(OCF_2CF_2)_aO(CF_2)_5O(CF_2CF_2O)_bCF_2CN$$

This method for preparing the dinitriles is disclosed in U.S. Pat. No. 3,960,814.

The synthesis of fluorocarbon dinitriles in which $R_f$ is radical (4) or (5) above is described in Examples I and II hereinafter.

The fluorocarbon dinitrile in which $R_f$ is radical (6) above is the dimer of the dinitrile having radical (2) as its $R_f$ groups. The preparation of the dimer is described in Example III hereinafter.

A more comprehensive understanding of the invention can be obtained by referring to the following illustrative examples which are not intended, however, to be unduly limitative of the invention.

EXAMPLE I

Preparation of $NC(CF_2)_4OCH_2(CF_2)_3CH_2O(CF_2)_4CN$ a. $FCO(CF_2)_4OCH_2(CF_2)_3CH_2O(CF_2)_4COF$ A 300-ml, stainless steel autoclave was equipped with 1000 psi gage, 2800 psi rupture disc and Hoke valve. Hexafluoropentanediol [$HOCH_2(CF_2)_3CH_2OH$, 31.8 g, 0.15 mole] was charged to the clave which was then sealed and evacuated. Perfluoroglutaric anhydride [$CF_2(CF_2-CO)_2O$, 73.5 g, 0.33 mole] was sucked into the clave which was then rocked at 130° C overnight to give the diester-diacid [$HO_2C(CF_2)_3CO_2-CH_2(CF_2)_3CH_2O_2C(CF_2)_3CO_2H$]. Sulfur tetrafluoride (110 g, 1.02 moles) and hydrogen fluoride (40 ml) were condensed (−183° C) into the clave which was then rocked at 150° C overnight (900 psig — maximum observed pressure). The clave was cooled (−183° C) and evacuated through two Monel traps (−78° C followed by −183° C). The clave was then allowed to come to room temperature and vented into the traps. The clave was brought to atmospheric pressure with nitrogen and opened. The clear, colorless product was shown to be one component by GLC.

b. $H_2NCO(CF_2)_4OCH_2(CF_2)_3CH_2O(CF_2)_4CONH_2$

A Freon-113 (100 ml) solution of the above acid fluoride was reacted with methyl alcohol (60 ml, 1.48 moles) with cooling. The solution was washed twice with water (2 + 10 ml) and once with aqueous potassium fluoride (300 ml). The aqueous potassium fluoride solution was washed once with Freon-113 (100 ml). The Freon solutions were combined, cooled to 0° C and ammonia was refluxed into the stirred solution. Evaporation under full vacuum gave the diether-diamide (92.5 g, 88.5% of theory based on hexafluoropentanediol used.)

c. $NC(CF_2)_4OCH_2(CF_2)_3CH_2O(CF_2)_4CN$

The diether-diamide (92.5 g, 0.133 mole) was mixed with $P_2O_5$ (100 g) and the mixture was covered with $P_2O_5$ (40 g). The mixture was heated at 230° C and 195 mm Hg for one hour. The pressure was gradually reduced and the product was stripped over as a cloudy liquid (57 g). Distillation gave a slightly cloudy product (b.p. 106°–108° C/3 mm Hg, 52.0 g, 50% yield). Pressure filtration (nitrogen) through 2 4–8μ sintered glass filter gave a clear, colorless product (99+% purity by GLC).

Analysis Calc'd for $C_{15}F_{22}H_4N_2O_2$: C, 27.21; N, 4.23; H, 0.61: Found: C, 26.61; N, 4.81; H, 0.62.

EXAMPLE II

Preparation of $NC(CF_2)_4OCH_2(CF_2)_4OCH_2(CF_2)_3CH_2O(CF_2)_4C-H_2O(CF_2)_4CN$ a. $FCO(CF_2)_4OCH_2(CF_2)_3CH_2O(CF_2)_4COF$ Following the procedure and scale described above in Example I, $FCO(CF_2)_4OCH_2(CF_2)_3CH_2O(CF_2)_4COF$ was prepared. The acid fluoride was removed from the clave by adding Freon-113 (2 × 150 ml) under vacuum, pressuring with nitrogen to 10 psig and forcing the solution from the inverted clave. Infrared and GLC showed the product to be that desired.

b. $HOCH_2(CF_2)_4OCH_2(CF_2)_3CH_2O(CF_2)_4CH_2OH$

A two-liter, three-necked flask was equipped with heater, mechanical stirrer, addition funnel and condenser leading to a nitrogen by-pass. Sodium borohydride (25 g, 0.66 mole) and dry monoglyme (500 ml) were added to the flask. A Freon-113 solution of the above acid fluoride (350 ml) was added slowly to the stirred reaction mixture. The temperature rose to ca. 50° C during the addition and was maintained at that temperature overnight. Water (300 ml) was added cautiously to the flask. As the first few milliliters of water entered the flask a vigorous evolution of hydrogen ejected part of the reaction mixture from the flask. Dropwise addition of water was continued. The mixture was filtered and the two liquid layers were separated. The upper layer was washed with Freon-113 which was then combined with the lower layer. The combined Freon solution was washed with water, dried over magnesium sulfate and filtered. The Freon-113 was evaporated under vacuum to give a clear, liquid product (56.5 g, 83 mmoles or 55% of theory). Infrared analysis showed no carbonyl absoprtion.

c. $CH_3OCO(CF_2)_4OCH_2(CF_2)_4OCH_2(CF_2)_3C-H_2O(CF_2)_4CH_2O(CF_2)_4CO_2CH_3$

The diol prepared in (b) above (56.5 g, 83 mmoles) was added to a 300-ml autoclave as a Freon-113 solution. The solvent was removed under vacuum and perfluoroglutaric anhydride (50 g, 0.225 moles) was added. The clave was heated at 130° C overnight. To determine if excess anhydride had been added, the clave was evacuated through a small (−183° C) trap. Infrared analysis of the volatiles showed it to be perfluoroglutaric anhydride.

Sulfur tetrafluoride (100 g, 0.93 mole) and hydrogen fluoride (40 ml) were condensed into the clave at −183° C. The clave was then rocked at 150° C for 19 hours, cooled (−196° C) and evacuated through two Monel traps (−78° C followed by −196° C). The clave was allowed to warm to room temperature and the volatile gases were transferred to the traps. After all volatiles had been transferred, the clave was cooled and methyl alcohol (50 ml, 1.24 moles) was sucked into it. The clave was warmed to room temperature and rocked a few minutes. The solution was then blown out of the clave using nitrogen pressure (10 psig). The clave was rinsed out twice with Freon-113. The Freon-113 solution of the product was washed with water (4 × 150 ml), dried over anhydrous magnesium sulfate and filtered.

d. H$_2$NCO(CF$_2$)$_4$OCH$_2$(CF$_2$)$_4$OCH$_2$(CF$_2$)$_3$CH$_2$O(CF$_2$)$_4$CH$_2$O(CF$_2$)$_4$CONH$_2$ The Freon-113 solution of the ester prepared in (c) above was charged to a 500-ml, three-necked flask equipped with magnetic stirrer, thermometer, stopcock adapter and dry ice condenser leading through a $-183°$ C trap to a manifold equipped with a nitrogen by-pass. The flask was cooled to 3° C and the condenser was filled with dry ice-acetone. With nitrogen flowing, ammonia was slowly refluxed into the system. Ammonia addition was stopped when the reflux rate increased dramatically and the pot temperature dropped to $-5°$ C. The solution was allowed to reflux for 0.5 hour. The condenser was removed and the ammonia and Freon-113 were removed under vacuum. The product was transferred to a 500-ml, one-necked flask and melted under vacuum to remove all solvent and any traces of water (80 g crude; 96 g theory based on diol in (b); 83% of theory).

e. 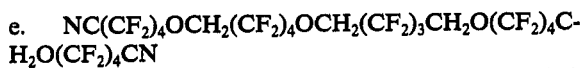NC(CF$_2$)$_4$OCH$_2$(CF$_2$)$_4$OCH$_2$(CF$_2$)$_3$CH$_2$O(CF$_2$)$_4$CH$_2$O(CF$_2$)$_4$CN The amide prepared in (d) above (80 g, 69 mmoles) was covered with phosphorus pentoxide (150 g, 1.06 moles) and heated under vacuum (0.05 mm Hg) up to 220° C. As long as distillate was being continuously collected, the temperature was maintained at 220° C; when the distillate stopped coming over, the temperature was increased to 300° C. A total of 43 g of product was collected. The pot residue was refluxed with Freon-113 (2 × 200 ml) to extract any residual product. From the extract was obtained 24 g of product. The two samples were combined (67 g, 59.7 mmole as 86.5% of theory) and distilled using a one-foot heated column packed with ¼ inch glass helices. Only one narrow boiling distillation cut (20.4 g; 130–132/0.001 mm Hg) could be obtained. Lows and highs were obtained. The pure cut represented a 26.4% yield from the amide. All of the product was shown to be nitrile from infrared but it varied in molecular weight.

Analysis Calc'd for $C_{25}F_{38}H_8N_2O_4$: C, 26.74; N, 2.50; H, 0.71: Found: C, 26.81; N, 2.62; H, 0.80.

EXAMPLE III

A 250 milliliter, three-necked flask was equipped with a magnetic stirring bar, thermometer, stopper and a quartz reflux column. The quartz column was connected to a vacuum manifold through a liquid oxygen trap. After drying the apparatus thoroughly by heating under vacuum, a diacid fluoride (200.3 g, 0.142 mole) was added to the flask. The diacid fluoride was prepared in accordance with the process disclosed in U.S. Pat. No. 3,250,807 and had the following formula:

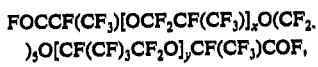FOCCF(CF$_3$)[OCF$_2$CF(CF$_3$)]$_x$O(CF$_2$)$_5$O[CF(CF)$_3$CF$_2$O]$_y$CF(CF$_3$)COF, where $(x+y)$ equals 5. Under 0.01 mm pressure, the diacid fluoride was refluxed up through the quartz reflux column which was irradiated with a 450 watt Hanovia lamp. The photolysis was terminated after 172 hours giving 187.7 g of crude dimer product. This product was distilled to give the following results:

| Fraction | Boiling Range,C | Pressure mm Hg | Wt., g | % Yield |
|---|---|---|---|---|
| 1 | 114–215 | 0.11–0.48 | | |
| 2 | 215–228 | 0.48–0.75 | 166.3 | 86.2 |
| 3 | 228–272 | 0.75–1.2 | | |
| 4 | 272–300 | 1.2 | | |

The neutralization equivalent of fraction 2 was 648.4 compared to the calculated value of 679.5. The deviation of the observed value from the calculated value was 4.58 percent. The diacid fluoride dimer had the following formula:

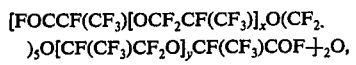[FOCCF(CF$_3$)[OCF$_2$CF(CF$_3$)]$_x$O(CF$_2$)$_5$O[CF(CF$_3$)CF$_2$O]$_y$CF(CF$_3$)COF$]_2$O, where $(x+y)$ equals 5.

The diacid fluoride dimer was reacted with ammonia to give the diamide which was reacted with phosphorus pentoxide to give the dinitrile dimer. The procedure described in Example I was followed in carrying out these two reactions to provide a fluorocarbon dinitrile dimer having the following formula:

[NCCF(CF$_3$)[OCF$_2$CF(CF$_3$)]$_x$O(CF$_2$)$_5$O[CF(CF$_3$)CF$_2$O]$_y$CF(CF$_3$)]$_2$O, where $(x+y)$ equals 5.

EXAMPLE IV

A run was conducted in which a fluorocarbon triazine polymer was prepared, utilizing a fluorocarbon dinitrile having the following formula:

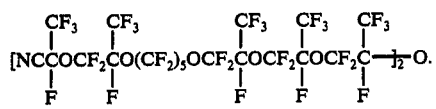[NCCOCF$_2$CO(CF$_2$)$_5$OCF$_2$COCF$_2$COCF$_2$C$]_2$O.
(with CF$_3$ substituents and F substituents as shown)

The dinitrile (7.94 g) was dried over P$_2$O$_5$ and dissolved in 1,1,2-trifluoro-1,2,2-trichloroethane (10 ml). Silver perfluorobutyrate was dried, dissolved in dry tetrahydrofuran (30 ml) and mixed with the dinitrile in a flask. As ammonia was bubbled into the stirred mixture, it became an opaque white emulsion without the usual ammonianitrile exotherm. After 4 hours at room temperature, the stirring and ammonia addition were stopped. Two layers of liquid formed with a white precipitate at the surface. The lower layer was too viscous to stir. Vacuum removal of solvents yielded a rubbery silver coordinated polymer.

The light stable silver chelated polymer was dissolved in an excess of perfluorobutyric anhydride to yield a clear solution containing precipitated silver perfluorobutyrate. The butyrate was separated from the solution by filtration. Removal of excess anhydride yielded a polymer that still contained some silver salt. The polymer was dissolved in hexafluoroxylene after which HCl gas was bubbled through the solution, causing silver chloride to precipitate. Filtering off the silver chloride and removal of the solvent yielded 8.1 g of water clear tough elastomeric polymer. The polymer had an intrinsic viscosity [$n$] of 0.395 as measured in perfluorotributylamine at 37.8° C.

Analysis Calc'd for $(C_{54}F_{103}N_3O_{14})_n$: C, 22.57; N, 1.46: Found: C, 22.59; N, 1.84.

A 0.5 gram sample of the polymer was heated for 2 hours at 600° F in an air circulating oven. As a result of this heating, there was a loss of 0.08 g of polymer. An additional heating for 16 hours at 600° F caused no further loss in weight and no noticeable change in appearance.

A sample of the polymer was mixed with methanol-solubilized chromic acetate and a small amount of fumed silica filler. The thixotropic sealant crosslinked after 16 hours at 175° F. Air aging of the triazine polymer sealant for 16 hours at 600° F showed no change in physical characteristics.

EXAMPLE V

The triazine polymer of Example III was compounded in accordance with the following recipe:

|  | Parts by weight |
|---|---|
| Triazine polymer | 100 |
| Hydrophobic fumed silica | 20 |
| Ferrous acetylacetonate | 10 |

The compounded polymer was oven cured at 145° C for 3 hours. The vulcanizate as obtained and after heating at 300° C for 1 hour had the following physical properties:

|  | Before Heating | After Heating |
|---|---|---|
| Tensile strength, psi | 134 | 155 |
| Elongation % | 525 | 350 |
| Shore A Hardness | 65 | 68 |

The vulcanizate was insoluble in boiling (170° C) perfluorotributylamine, indicating that the triazine polymer was crosslinked.

EXAMPLE VI

A fluorocarbon triazine polymer was prepared, following the same procedure and using the same materials as described in Example IV except that perfluorobutyric anhydride was replaced by trifluoroacetic anhydride. The weight of the dinitrile used was 48.78 grams. A yield of 38 g of colorless transparent millable polymer was obtained.

The polymer was mixed with tetraphenyltin and then vulcanized into white opaque sheets by heating for 1 hour at 320° F and then post curing by heating at 400° F for 24 hours. Physical properties of the cured polymer before and after air aging are shown below in the table.

TABLE

|  | Before Aging | After Air Aging at 600° F for 24 hours |
|---|---|---|
| Tensile strength, psi | 230 | 410 |
| Elongation, % | 160 | 180 |
| Hardness, Shore A | 52 | 55 |
| Weight loss, % |  | 5 |

As seen from the foregoing, the present invention provides a process for preparing novel linear triazine polymer. Because of their thermal and hydrolytic stability, the polymers are particularly useful in sealant applications.

As will be evident to those skilled in the art, modifications of the present invention can be made in view of the foregoing disclosure without departing from the spirit and scope of the invention.

I claim:

1. A linear fluorocarbon triazine polymer consisting essentially of recurring units having the following formula:

in which $R_f$ is $-(CF_2)_4OCH_2(CF_2)_3CH_2O(CF_2)_4-$ or $-(CF_2)_4OCH_2(CF_2)_4OCH_2-$ $(CF_2)_3CH_2O(CF_2)_4CH_2O(CF_2)_4-$; $R_f'$ is a perfluoroalkyl radical containing 1 to 12, inclusive, carbon atoms; and $n$ is an integer equal to the number of recurring units.

2. The fluorocarbon triazine polymer according to claim 1 in which $R_f$ is $+CF_2)_4OCH_2(CF_2)_4OCH_2(CF_2)_3CH_2O(CF_2)_4CH_2O(CF_2)_4-$.

3. The fluorocarbon triazine polymer according to claim 1 in which $R_f$ is $+CF_2)_4OCH_2(CF_2)_3CH_2O(CF_2)_4-$.

4. A process for preparing a fluorocarbon triazine polymer which comprises the steps of:

a. reacting stoichiometric amounts of (1) a fluorocarbon dinitrile having the formula $N\equiv CR_fC\equiv N$, (2) a silver compound having the formula $$AgOCR'_f\overset{O}{\overset{\|}{}}$$

and (3) ammonia, $R_f$ being a perfluoroalkylene or perfluoroalkylene ether group and Rhd f' being a perfluoroalkyl radical;

b. recovering from step (a) a silver coordinated polymer having the following formula:

where $R_f$ is as indicated above and $n$ ranges from about 10 to 100;

c. reacting the silver coordinated polymer with a molar excess of a fluorocarbon acid anhydride having the formula $$(R_f''C\overset{O}{\overset{\|}{}})_2-O$$

where $R_f''$ is a perfluoroalkyl radical; and d. recovering from step c a fluorocarbon triazine polymer having the following formula:

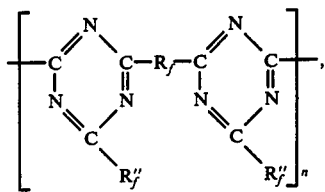

where $R_f$, $R_f''$ and $n$ are as indicated above.

5. The process according to claim 4 in which step (a) is conducted at about room temperature for a period ranging from about 2 to 10 hours in an ether or fluorohydrocarbon solvent and step (c) is conducted at about room temperature for a period ranging from about 1 to 3 hours.

6. The process according to claim 4 in which an excess of ammonia ranging from about 1.5 to 2.0 moles per mole of the silver compound is used in step (a); and about 1.5 to 2.0 moles of the fluorocarbon acid anhydride per mole of the silver coordinated polymer are reacted in step (c).

7. The process according to claim 6 in which $R_f$ is $-(CF_2)_m-$, where $m$ is an integer ranging from 3 to 15, inclusive; $-CF_2O(CF_2)_2OCF_2-$; $-CF(CF_3)[OCF_2CF(CF_3)]_xO(CF_2)_5O[CF(CF_3)CF_2O]_yCF(CF_3)-$, where $(x+y)$ equals zero to 25, inclusive; $-CF_2(OCF_2CF_2)_aO(CF_2)_5O(CF_2CF_2O)_bCF_2-$, where $(a+b)$ equals 2 to 7, inclusive; $-(CF_2)_4OCH_2(CF_2)_3CH_2O(CF_2)_4-$; $-(CF_2)_4OCH_2(CF_2)_4OCH_2(CF_2)_3CH_2O(CF_2)_4CH_2O(CF_2)_4-$; or $-[CF(CF_3)-[OCF_2CF(CF_3)]_xO(CF_2)_5O[CF(CF_3)_2CF_2O]_yCF(CF_3)-]_2O$, where $(x+y)$ equals zero to 25, inclusive; and $R_f'$ and $R_f''$ are perfluoroalkyl radicals containing 1 to 12, inclusive, carbon atoms.

* * * * *

UNITED STATES PATENT AND TRADEMARK OFFICE
CERTIFICATE OF CORRECTION

PATENT NO. : 4,102,872
DATED : July 25, 1978
INVENTOR(S) : Warren R. Griffin

It is certified that error appears in the above–identified patent and that said Letters Patent are hereby corrected as shown below:

Column 10, line 42, "Rhdf'" should read -- $R'_f$ --.

Signed and Sealed this

First Day of May 1979

[SEAL]

Attest:

RUTH C. MASON
Attesting Officer

DONALD W. BANNER
Commissioner of Patents and Trademarks